United States Patent
Prather

(10) Patent No.: US 11,571,954 B2
(45) Date of Patent: Feb. 7, 2023

(54) VEHICLE TOP LATCH AND SEAL ASSEMBLY

(71) Applicant: Philip E. Prather, Blue Mountains (CA)

(72) Inventor: Philip E. Prather, Blue Mountains (CA)

(73) Assignee: CLEAR LIDZ, INC.

( * ) Notice: Subject to any disclaimer, the term of this patent is extended or adjusted under 35 U.S.C. 154(b) by 0 days.

(21) Appl. No.: 17/736,323

(22) Filed: May 4, 2022

(65) Prior Publication Data

US 2022/0371415 A1 Nov. 24, 2022

Related U.S. Application Data

(60) Provisional application No. 63/189,731, filed on May 18, 2021.

(51) Int. Cl.
| | | |
|---|---|---|
| *B60J 7/19* | (2006.01) | |
| *B60J 10/82* | (2016.01) | |
| *B60J 7/11* | (2006.01) | |

(52) U.S. Cl.
CPC ............... *B60J 7/194* (2013.01); *B60J 7/11* (2013.01); *B60J 10/82* (2016.02)

(58) Field of Classification Search
CPC ..... B60J 7/19; B60J 7/192; B60J 7/194; B60J 7/196
USPC ................................................ 296/218, 224
See application file for complete search history.

(56) References Cited

U.S. PATENT DOCUMENTS

| | | | |
|---|---|---|---|
| 2,946,624 A | 7/1960 | Bela | |
| 4,095,841 A | 6/1978 | Thompson | |
| 4,149,750 A | 4/1979 | Thompson | |
| 4,364,600 A * | 12/1982 | Hauber | ................ B60J 7/1642 296/218 |
| 4,626,026 A | 12/1986 | Hasegawa | |
| 4,679,847 A | 7/1987 | Dirck | |
| 5,205,607 A | 4/1993 | Takeuchi | |
| 5,738,405 A | 4/1998 | Richters | |
| 5,931,114 A | 8/1999 | Bartholomew | |
| 6,186,584 B1 | 2/2001 | Samuelson | |
| 6,189,962 B1 | 2/2001 | Henderson | |
| 6,203,100 B1 * | 3/2001 | Gordon | .................... B60J 7/106 296/213 |
| 6,247,746 B1 * | 6/2001 | Brush | ..................... B60J 10/86 49/397 |
| 6,513,864 B2 | 2/2003 | Böhm | |
| 6,793,277 B2 | 9/2004 | Chon | |

(Continued)

*Primary Examiner* — Dennis H Pedder
(74) *Attorney, Agent, or Firm* — Lippes Mathias LLP

(57) ABSTRACT

A vehicle top latch and seal assembly system, comprising: a vehicle top portion having a back portion, front portion, left portion and right portion; a back left L-latch attached to the back portion; a back right L-latch attached to the back portion; a front left L-latch attached to the front portion; a front right L-latch attached to the front portion; a left side windshield latch; and a right side windshield latch. The left side windshield latch and the right side windshield latch may each have a raised spacer, three screws running through and attaching the raised spacer to the vehicle top portion, a latch cushioning rubber and a latch handle with an open position and a closed position. There may be foam spacers and T-knob assemblies in communication with portions of the vehicle top portion.

22 Claims, 19 Drawing Sheets

(56) References Cited

U.S. PATENT DOCUMENTS

| | | |
|---|---|---|
| 6,851,739 B2 | 2/2005 | Morley |
| 6,932,423 B2 * | 8/2005 | Stevens ................ B60J 7/10 296/121 |
| 7,086,693 B1 | 8/2006 | Huisman |
| D678,173 S | 3/2013 | Mcintire |
| 8,622,457 B1 | 1/2014 | Mcintire |
| 9,346,342 B1 * | 5/2016 | Bowles ................ B60J 7/06 |
| D832,185 S | 10/2018 | Mcintire |
| 2006/0220419 A1 | 10/2006 | Miura |
| 2007/0018485 A1 | 1/2007 | Jacobson |
| 2007/0182217 A1 | 8/2007 | Saleen |
| 2010/0045075 A1 | 2/2010 | Mack |

\* cited by examiner

VEHICLE TOP LATCH AND SEAL ASSEMBLY

The present invention relates to an assembly for a replacement roof for a vehicle. More specifically, the invention relates to an assembly for secure attachment of a transparent roof panel which is waterproof and provides enhanced visibility.

Many drivers desire a panoramic view of their surroundings while driving. While a convertible top provides this, there are some undesirable side effects. Occupants of the vehicle may get rained upon and have their hair blown around. It is also loud and makes conversation difficult for occupants of the vehicle. Sun roofs solve some of the problems of convertibles, but the amount of viewing space is limited. The present invention provides a clear top that allows for expansive views by the passengers, while minimizing the negative effects of a convertible or missing top (Noise, messy hair and possible inclement weather). It also allows for the top to be easily and quickly interchanged.

The present invention is directed to latches, seals and assemblies for replacement tops for vehicles. Many vehicles have tops which may be interchanged. By way of example, a Jeep style of vehicle may have many different tops for different purposes. There may be hard tops, soft tops and even different types of hard tops. According to one aspect of the present invention, a vehicle may be a Jeep and may have a portion of a top that is a clear top. Changing a top to a vehicle can present many challenges. It is critical that the top be securely attached and does not leak. This may be accomplished with custom bolts passed through the poly carbonate with an O ring on the top side and serrated lock washer and rubber washer on the bottom side. The foam spacers are also designed to keep out wind, water and all the weather elements.

BRIEF DESCRIPTION OF THE INVENTION

According to one embodiment of the present invention, a vehicle top latch and seal assembly system is provided with a vehicle top portion (1500) having a back portion (1502), front portion (1504), left portion (1518) and right portion (1520); a back left L-latch (1506) attached to the back portion (1502); a back right L-latch (1508) attached to the back portion (1502); a front left L-latch (1510) attached to the front portion (1504); a front right L-latch (1512) attached to the front portion (1504); a left side windshield latch (1514); and a right side windshield latch (1516).

According to another aspect of the present invention, a vehicle top latch and seal assembly system is provided having a vehicle top portion (1500) having a back portion (1502), front portion (1504), left portion (1518) with a rounded left side and right portion (1520) with a rounded right side and a centerline between the left portion and the right portion; a back left L-latch (1506) attached to the back portion (1502); a back right L-latch (1508) attached to the back portion (1502); a front left L-latch (1510) attached to the front portion (1504); a front right L-latch (1512) attached to the front portion (1504); a left side windshield latch (1514); and a right side windshield latch (1516).

BRIEF DESCRIPTION OF THE FIGURES

FIG. 1 depicts the underside of a transparent lid portion;
FIG. 2 depicts two foam spacers (left side foam spacer and ride side foam spacer);
FIG. 3 depicts 4 T-knobs;
FIG. 4 depicts an example of a vehicle with the factory top;
FIG. 5 depicts the latches on the inside of the vehicle;
FIG. 6 depicts that you unlatch the L-latches in the rear roll bar;
FIG. 7 depicts that you release clamps at the windshield;
FIG. 8 depicts the replacement space for the vehicle top portion;
FIG. 9 depicts the foam spacers installed;
FIG. 10 depicts the vehicle top portion being installed over the foam spacers;
FIG. 11 depicts that the 4 T-knobs are attached to the underside of the vehicle top portion;
FIG. 12 depicts that the two windshield clamps and two L Latches are closed and secured;
FIG. 13 depicts two back L-adapters;
FIG. 14 depicts the vehicle top portion installed according to one embodiment;
FIG. 15 depicts the underside of the vehicle top portion according to one embodiment;
FIG. 16 depicts an example of a front latching system between two lids;
FIG. 17 depicts a top view of a foam door seal spacer;
FIG. 18 depicts bottom view of a foam door seal spacer;
FIG. 19 depicts a side view of an L-Latch;
FIG. 20 depicts the front right hinge latch in the open position and the front right and left toggle latches in the closed position;
FIG. 21 depicts a windshield clamp;
FIG. 22 depicts the vehicle top without ridges;
FIG. 23 depicts the vehicle top;
FIG. 24 depicts a T-knob assembly;
FIGS. 25, 26 and 27 depict the raised spacer.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form.

Figure 1:
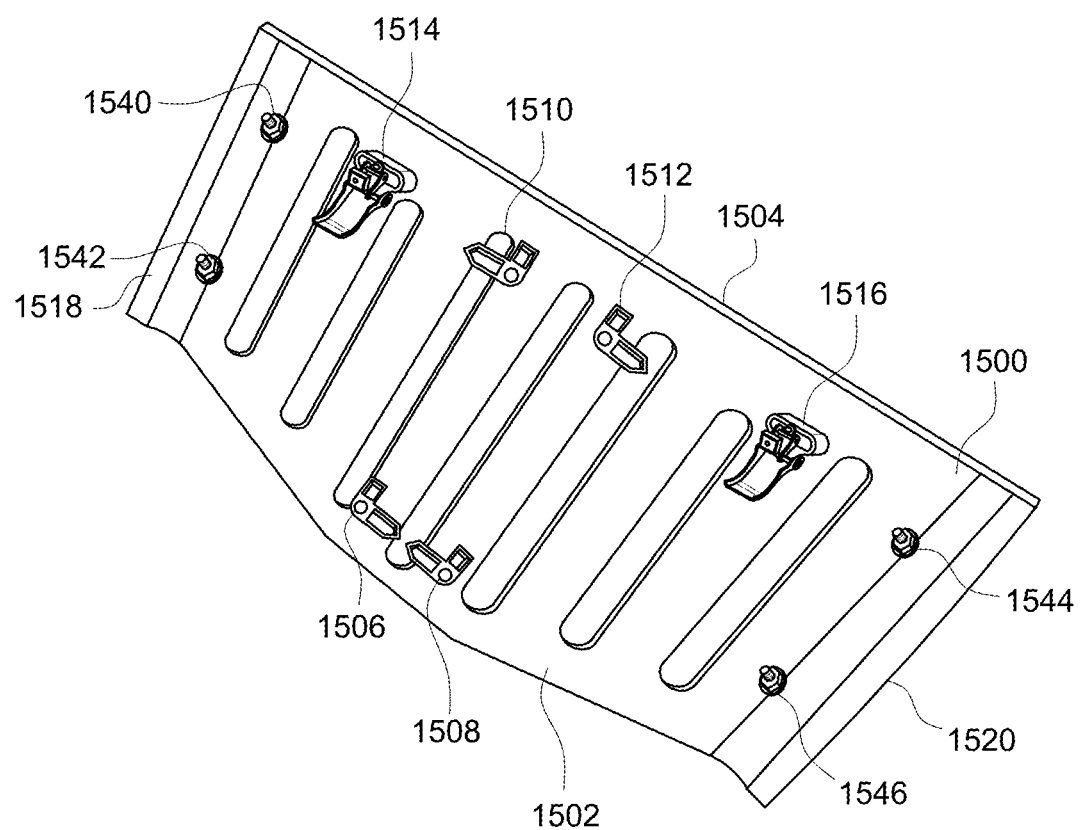
FIGS. 1-27 depict the present invention.
Figure 2:
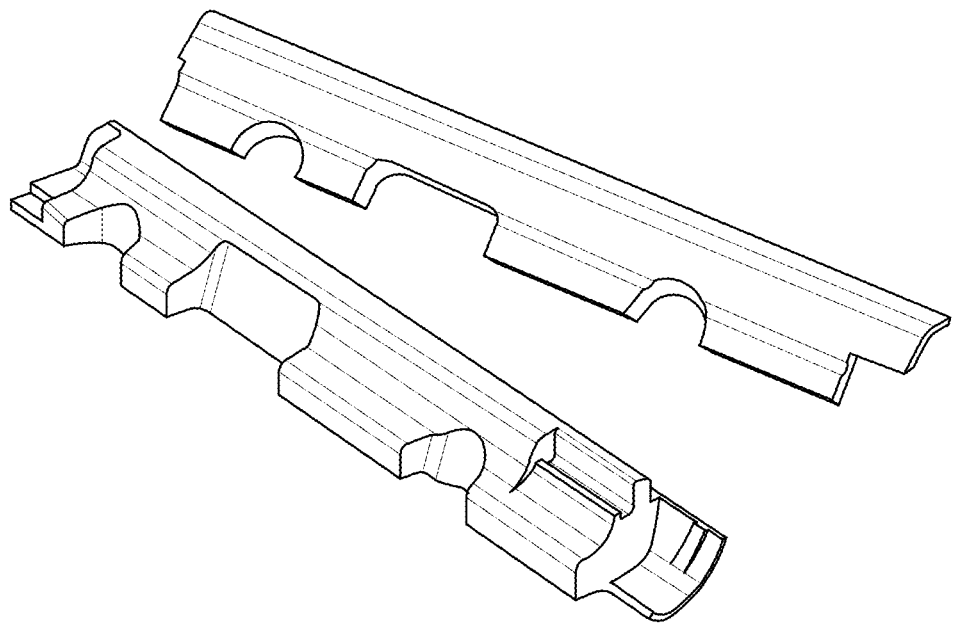
Figure 3:
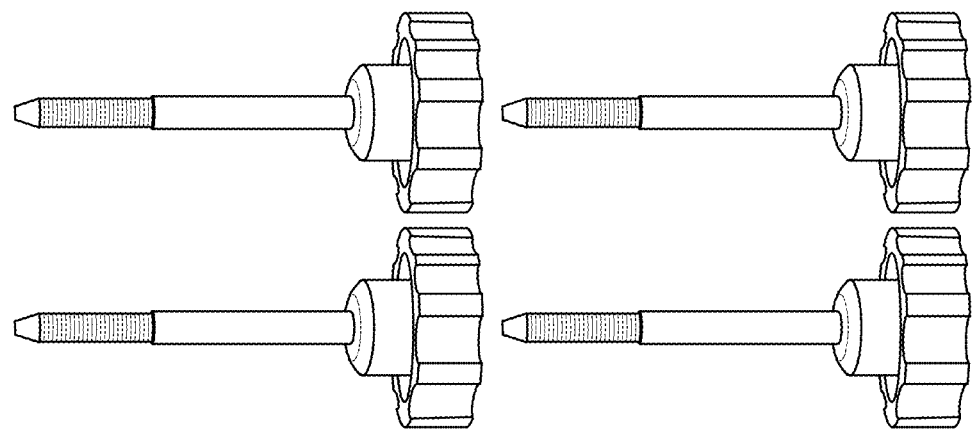
Figure 10:
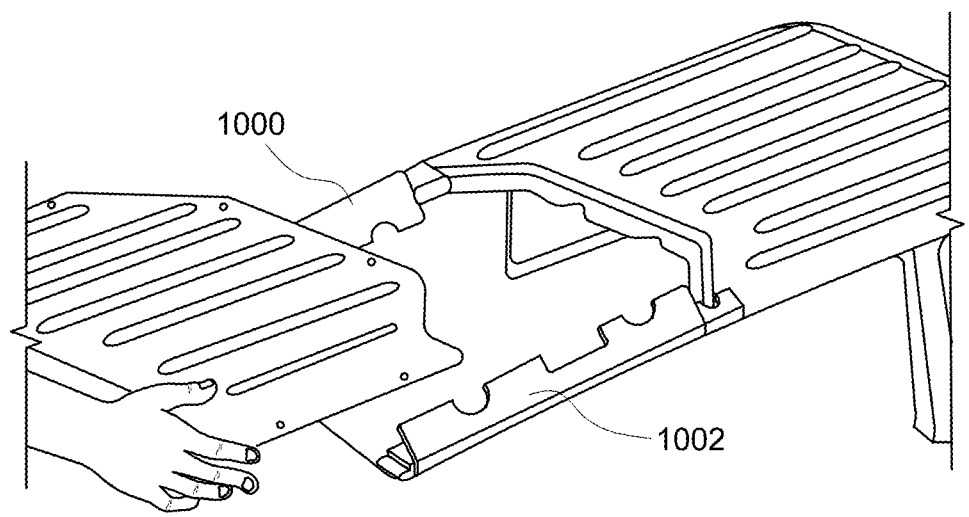
Figure 11:
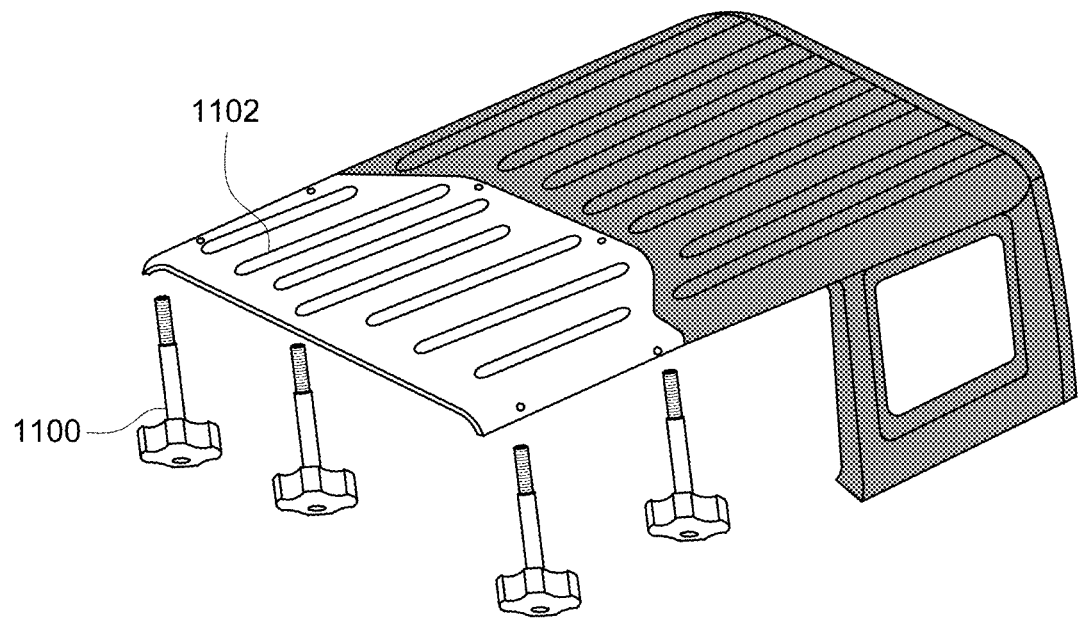
Figure 12:
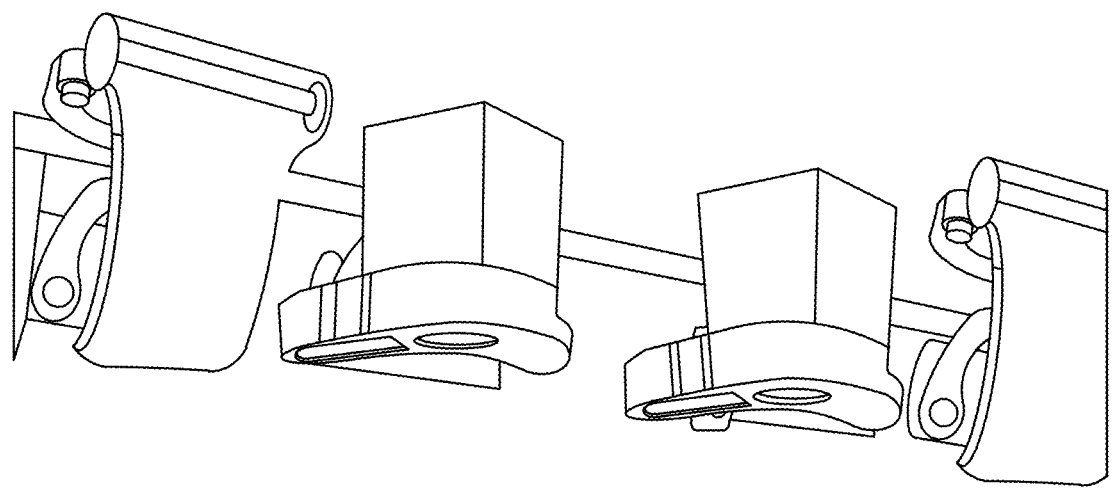
Figure 15:
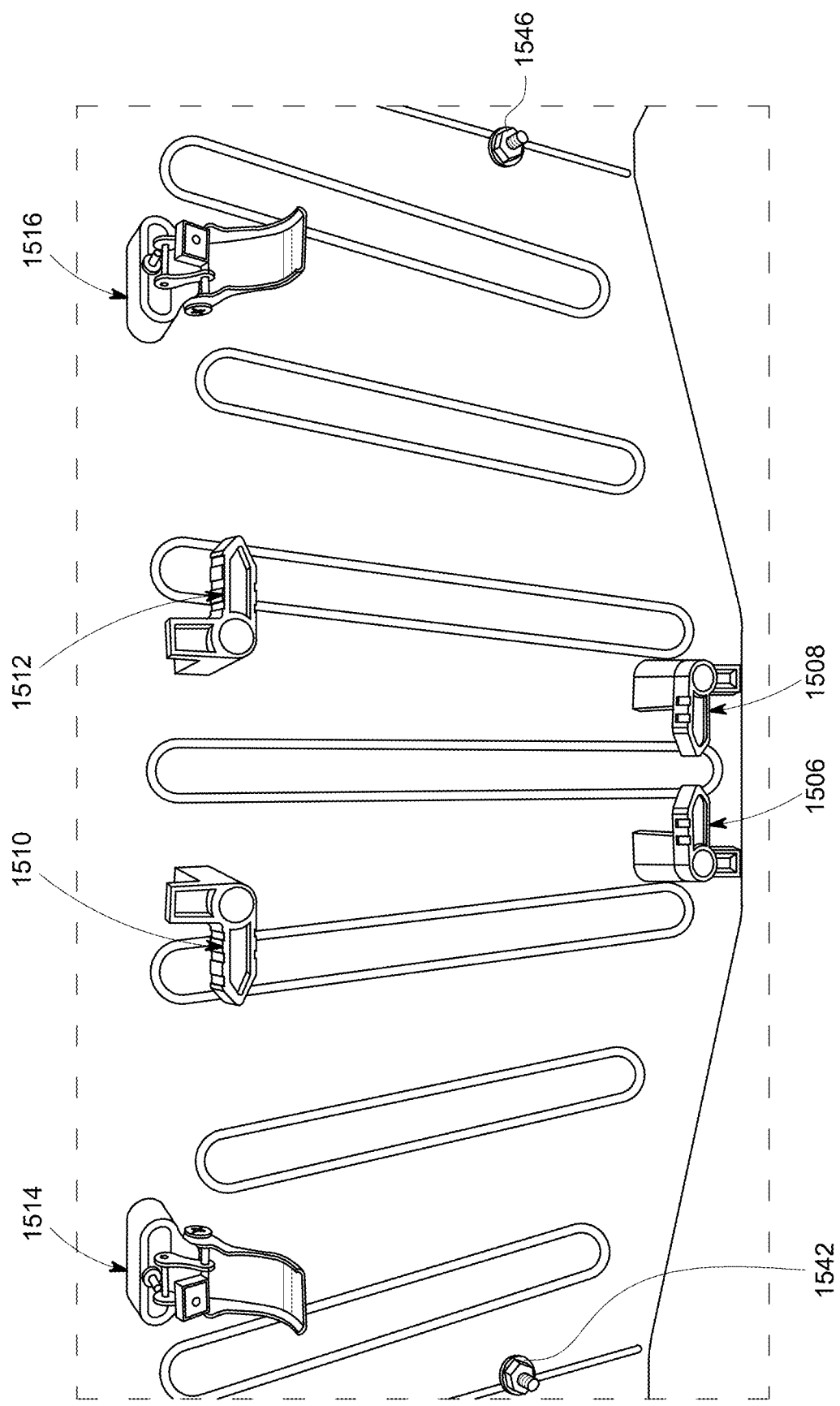
Figure 16:
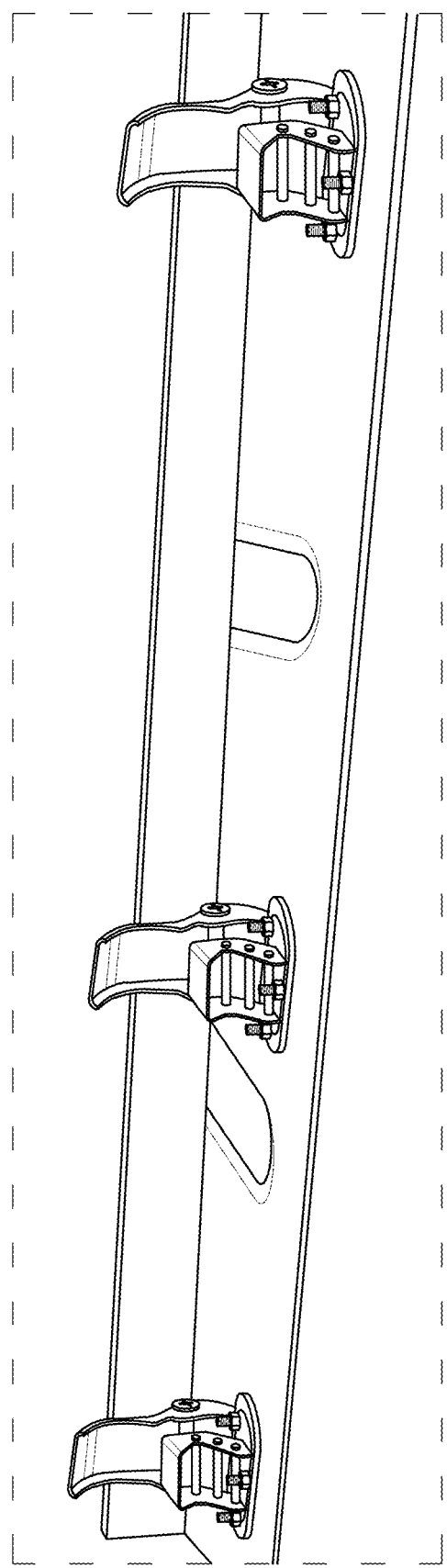
Figure 17:
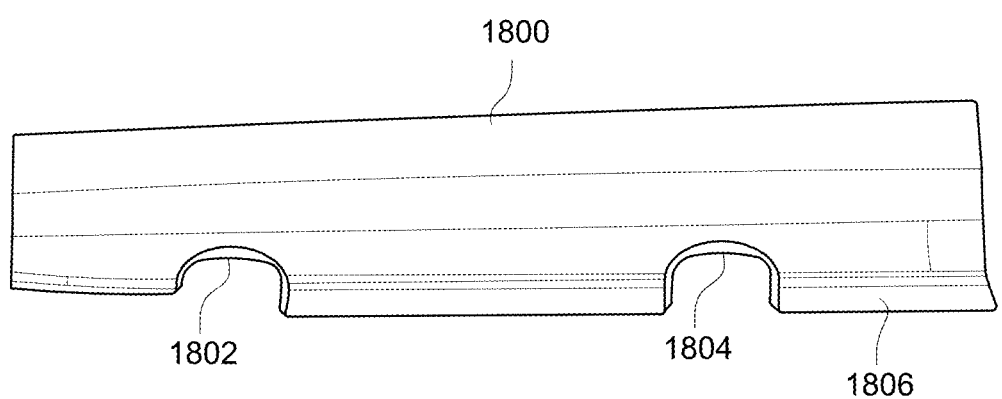
Figure 18:
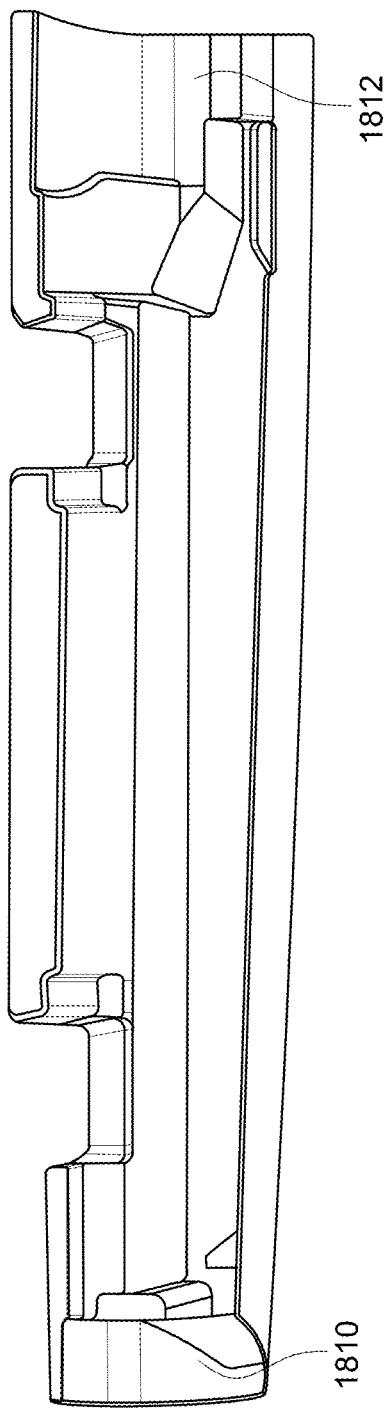
Figure 22:
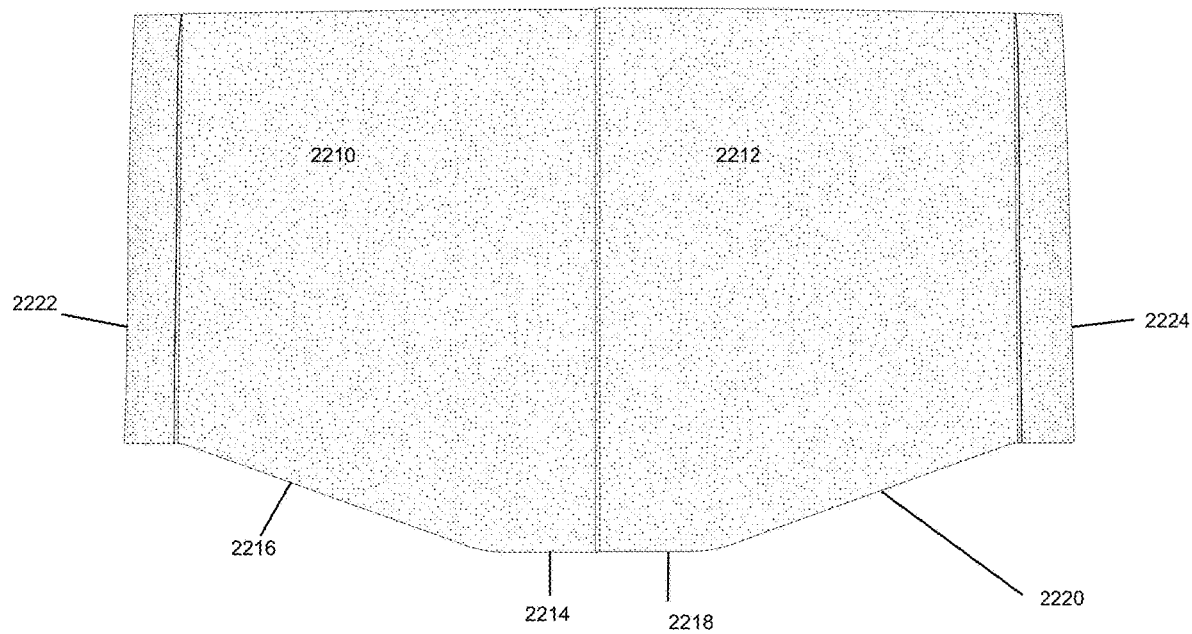
Figure 24:
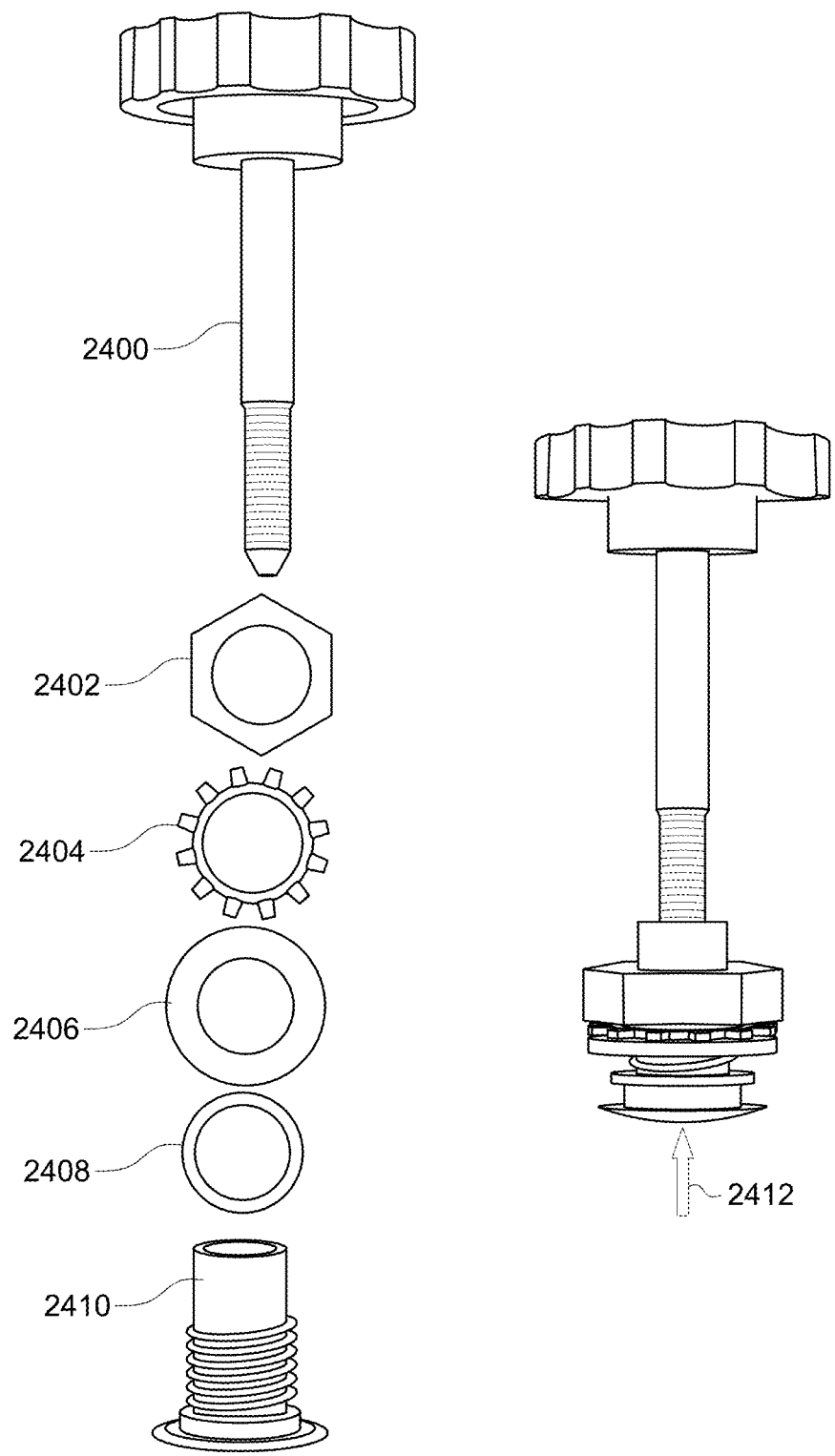

According to one aspect of the present invention, a portion of a roof top may be replaced with a clear portion. FIGS. 1 and 15 depict an example of a vehicle top latch and seal assembly according to the present invention, having a vehicle top portion (1500) having a back portion (1502), front portion (1504), left portion (1518) and right portion (1520); a back left L-latch (1506) attached to the back portion (1502); a back right L-latch (1508) attached to the back portion (1502); a front left L-latch (1510) attached to the front portion (1504); a front right L-latch (1512) attached to the front portion (1504); a left side windshield latch (1514); a right side windshield latch (1516) and a bottom portion of T-knob assemblies (1540, 1542, 1544 and 1546). FIGS. 2, 17 and 18 depict foam spacers. As shown in FIG. 17, each of the foam spacers may be an elongated piece with at least one semi-circular opening (1802, 1804) and a lip (1806). As shown in FIG. 18, there may be additional cut-out portions such as front cut-out portion (1810) and back cut-out portion (1812). The shape and location of the cut-out portions may be used to achieve a flush seated position of the transparent vehicle top. According to one embodiment, there are two foam spacers. As shown in FIG. 10, there may be a left foam spacer (1000) in communication with a left portion of the vehicle top portion and a right foam spacer (1002) in communication with a right portion of the vehicle top portion. As shown in FIG. 11, there may be at least one T-knob (1100). FIG. 11 depicts a vehicle top having at least one raised portion (1102). According to other embodiments, the top is smooth and does not have any raised portions (as depicted, by way of example, in FIG. 22). FIG. 24 depicts the T-knob assembly (2412) that has a thumb screw (2400), a hex nut (2402), a lock washer (2404), a rubber washer (2406), an o-ring (2408) and a screw (2410). The lock washer (2404) as depicted is serrated.

Figure 19:
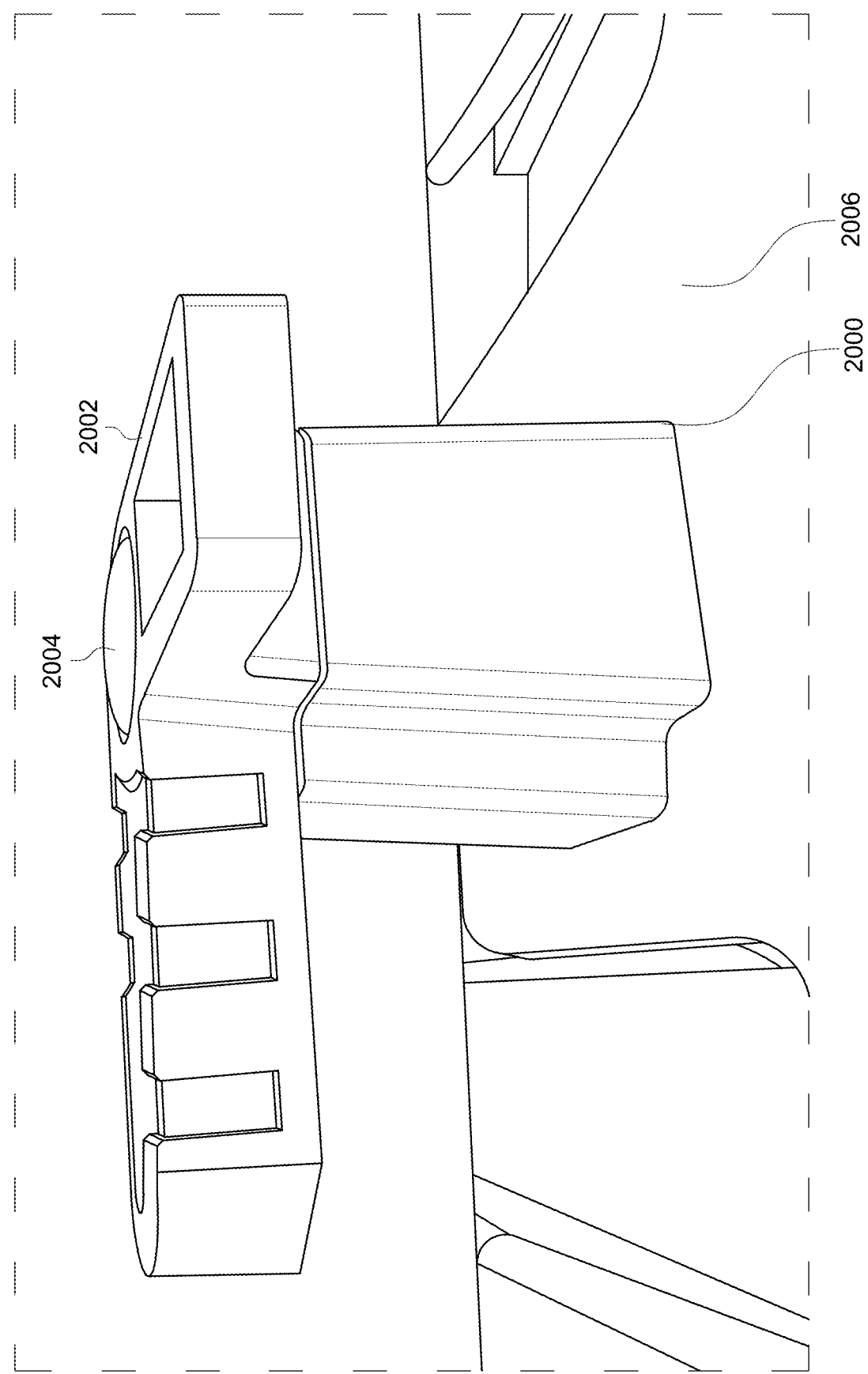
Figure 20:
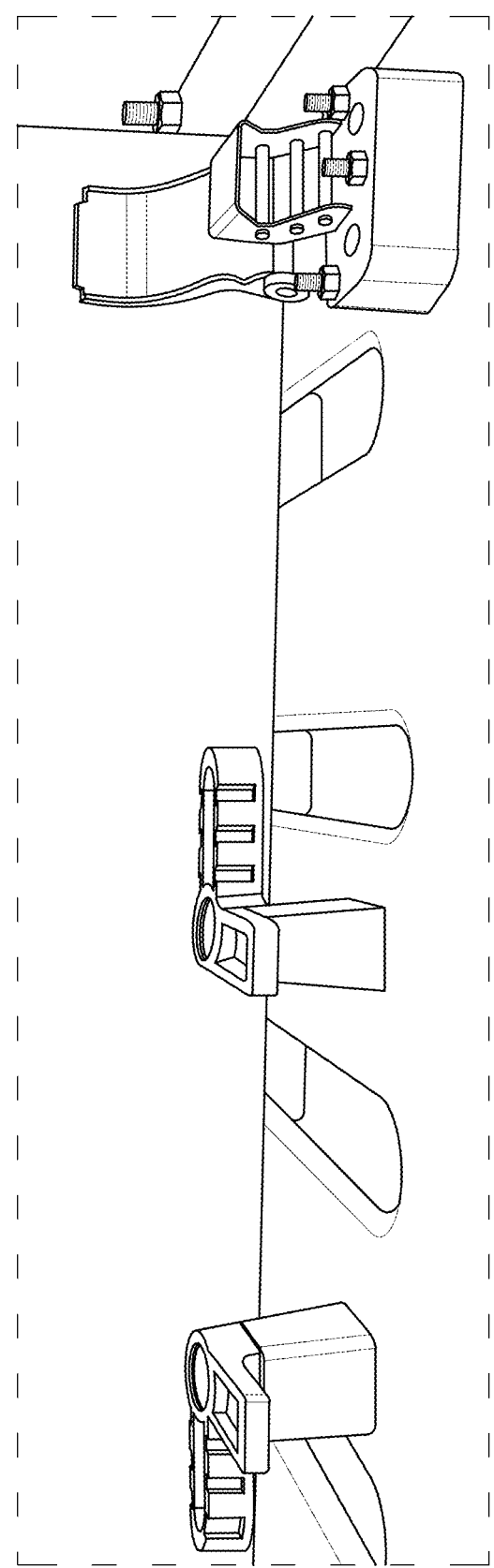

FIG. 19 depicts an example of an L-latch according to the present invention. The back left L-latch, the back right L-latch, front left L-latch and front right L-latch each have a bottom base portion (2000), a rotating top L portion (2002) and a bolt (2004) that runs through an opening in the top L portion (2002), an opening in the bottom base portion (2000) and through the vehicle top (2006).

Figure 21:
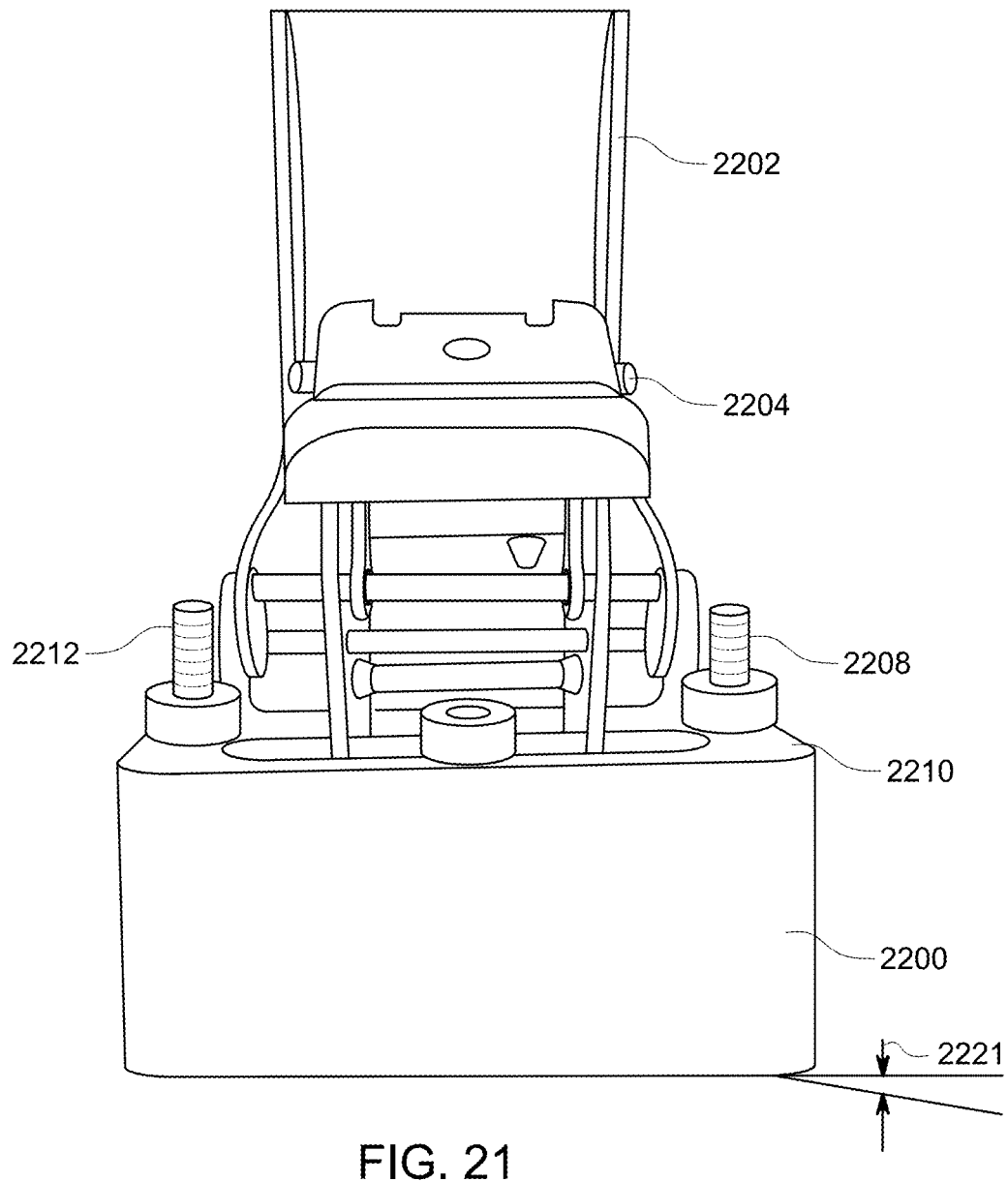
Figure 25:
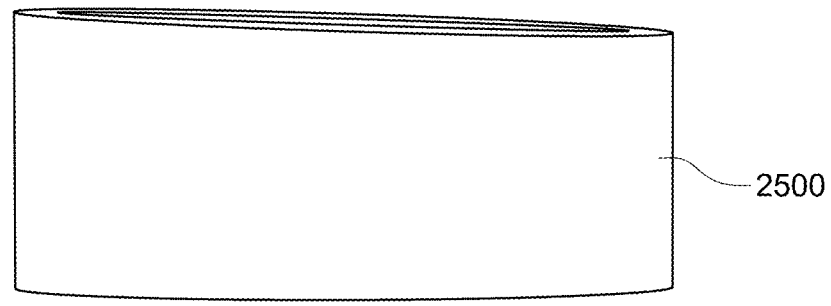
Figure 26:
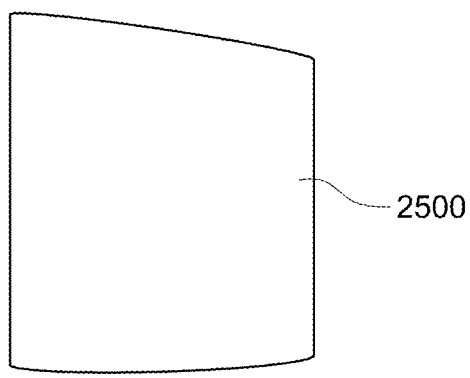
Figure 27:
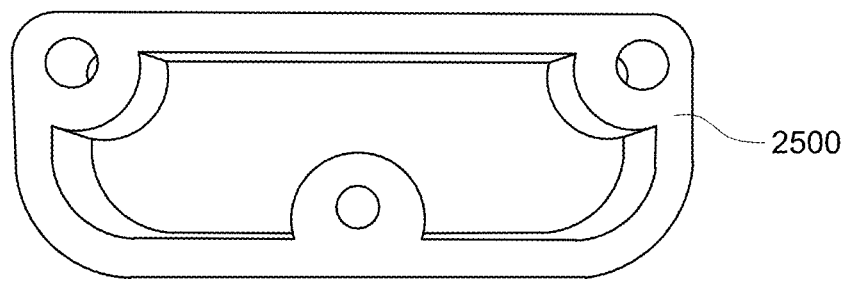

FIG. 21 depicts an example of a left side windshield latch and a right side windshield latch according to the present invention. They are similar parts, so with reference to either, each have a raised spacer (2200), three screws (2208) running through and attaching the raised spacer to the vehicle top portion, a latch cushioning rubber (2204) and a latch handle (2202) with an open position and a closed position. The raised spacer may be at an angle of is at an angle between one and fifteen degrees. The angle (2221) refers to the slight angle on the raised spacer that allows for the left side windshield latch and the right side latch to be level to prevent leakage. It is noted that the angle (2221) is between one and fifteen degrees from the horizontal, but the direction of the slope will be opposites from on the left side windshield latch to the right side windshield latch. FIGS. 25, 26 and 27 depict the raised spacer (2500) alone. This is useful to see the angle. As can be seen in FIGS. 25 and 26 there is a slight downward slope from left to right. As discussed, the slope may be from right to left depending on which side the windshield latch is.

Figure 23:
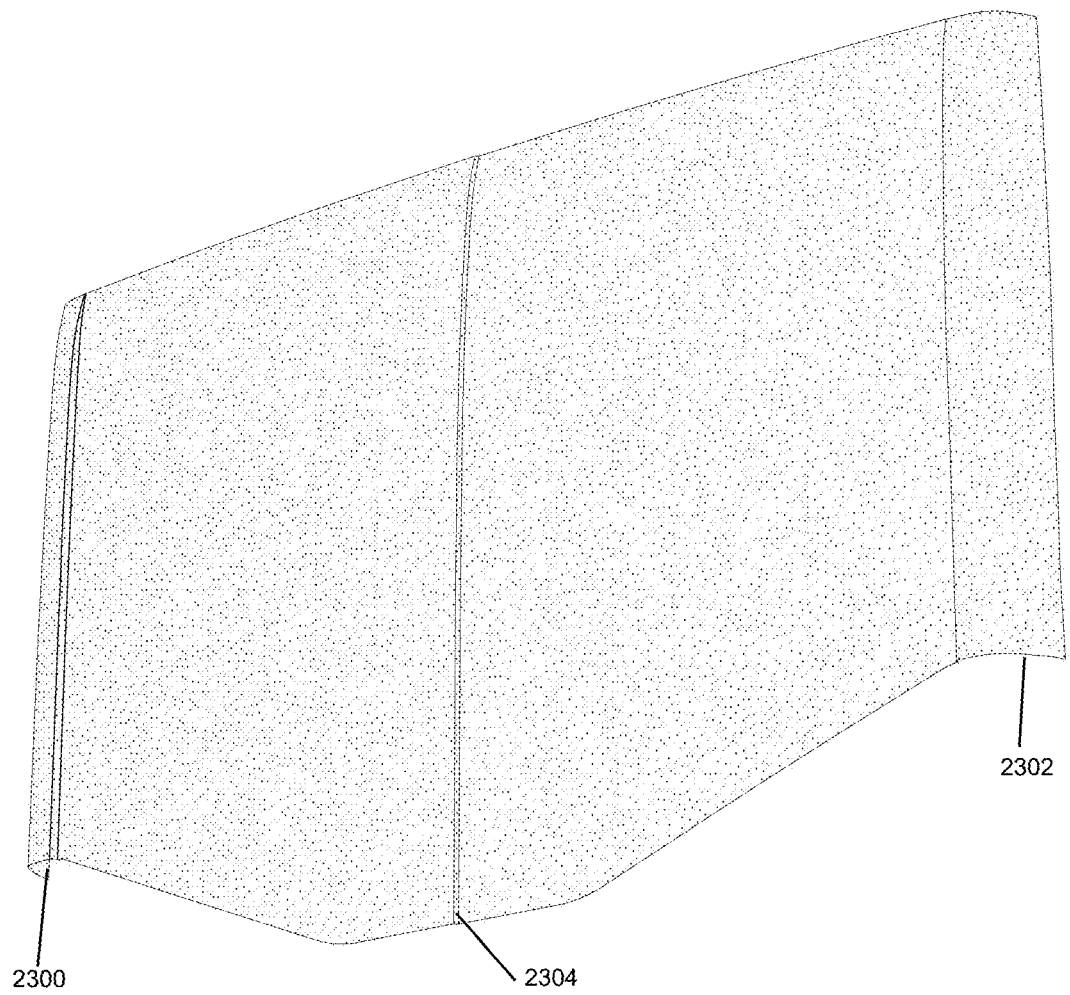

The vehicle top portion may have a left portion (2210) that has a flat section (2214) along the back portion and a slanted cutout section (2216) that runs from the flat section (2214) to a left side (2222) of the left portion of the vehicle top portion (1500). The right portion (2212) has a flat section (2218) along the back portion and a slanted cutout section (2220) that runs from the flat section to a right side (2224) of the right portion of the vehicle top portion. As shown in FIG. 23, a left side (2300) of the left portion and a right side (2302) of the right portion are rounded. This is to allow the vehicle top portion to sit on a portion of the vehicle (such as the roll bars) and allow the vehicle top to sit in place until firmly secured. The vehicle top may also have a centerline (2304) between the left portion and the right portion. This allows the location of the vehicle top to be aligned and easily positioned.

Figure 4:
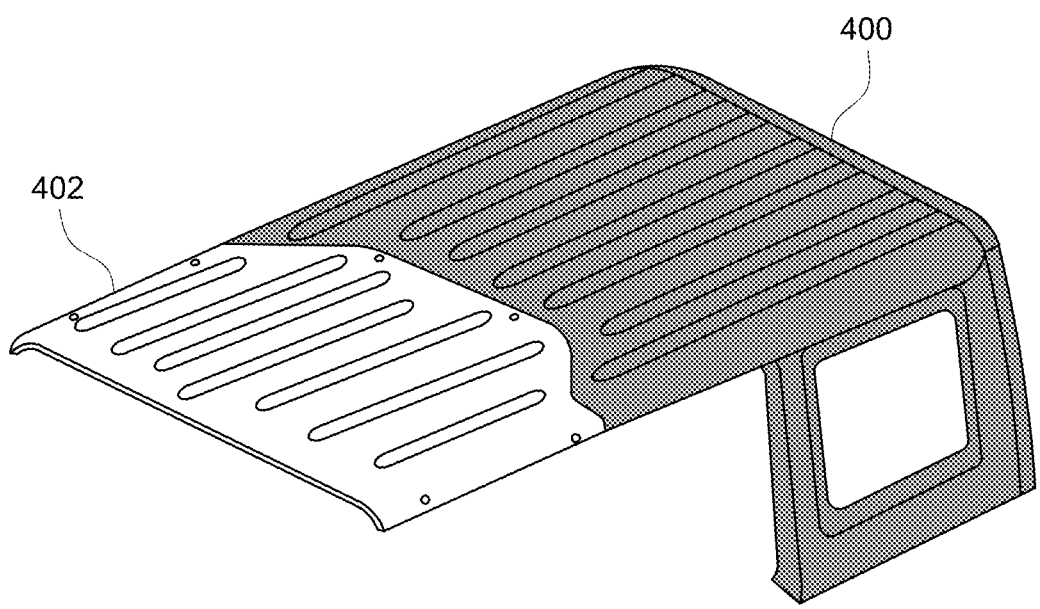
Figure 5:
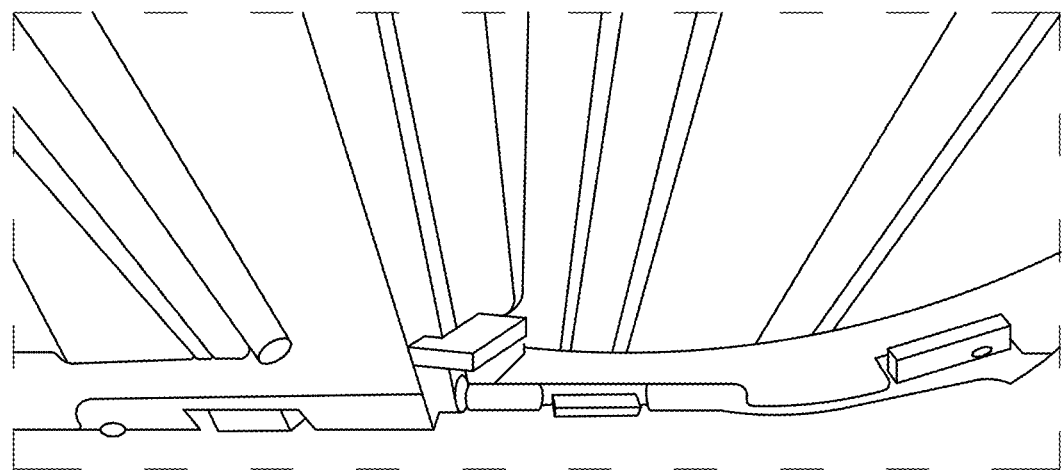
Figure 6:
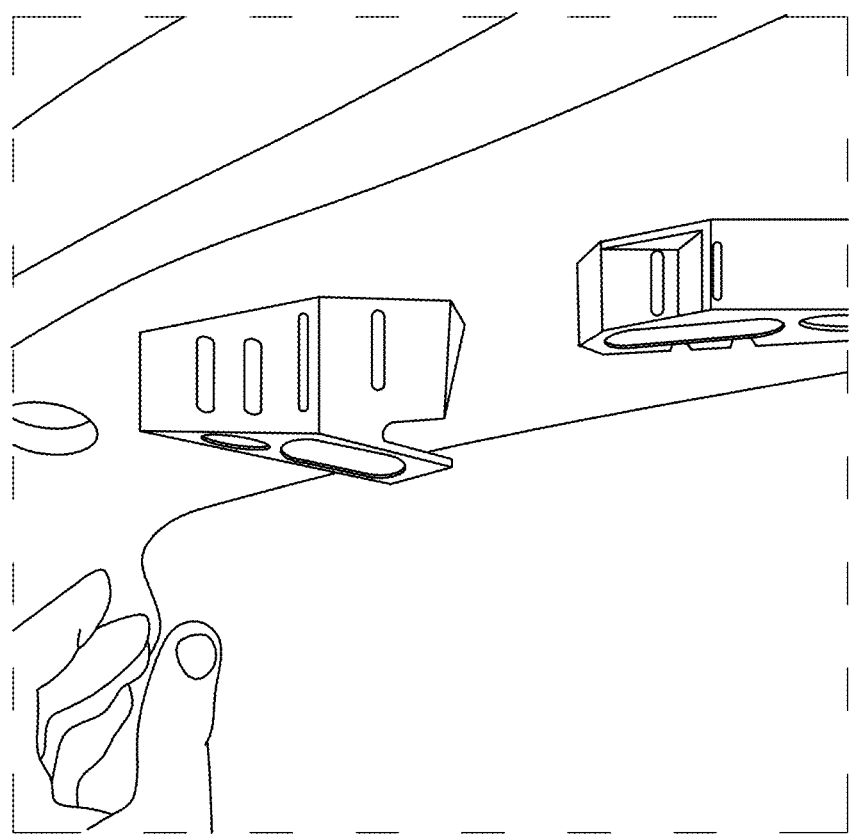
Figure 7:
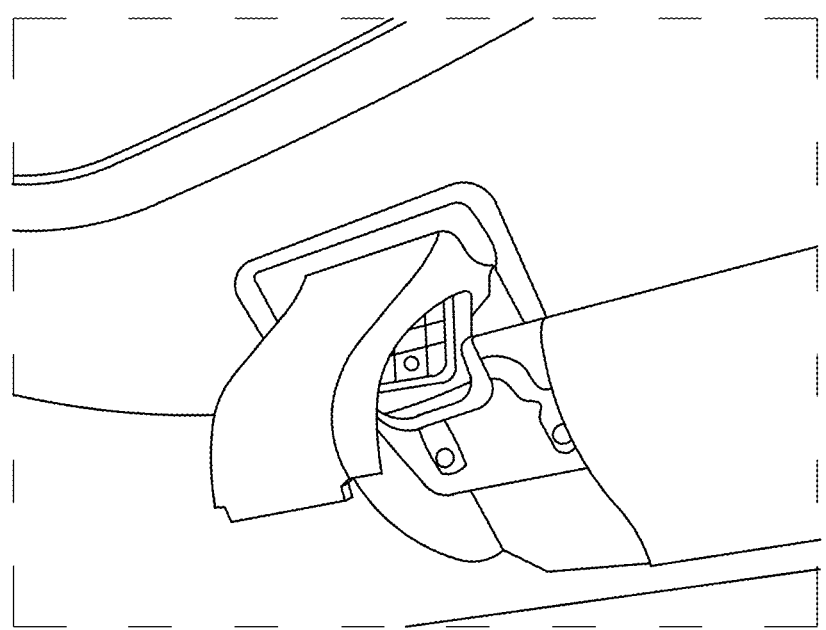
Figure 8:
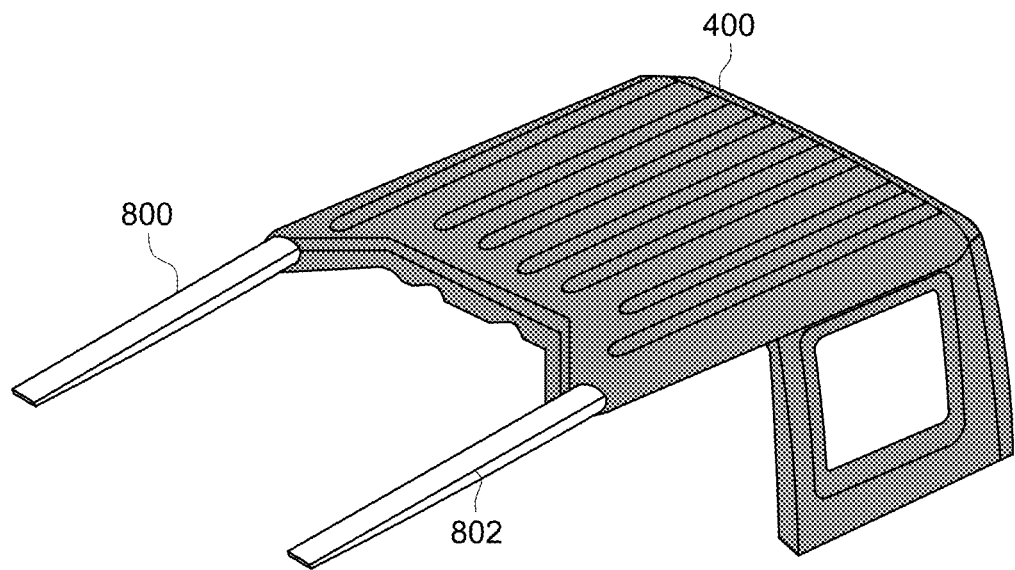
Figure 9:
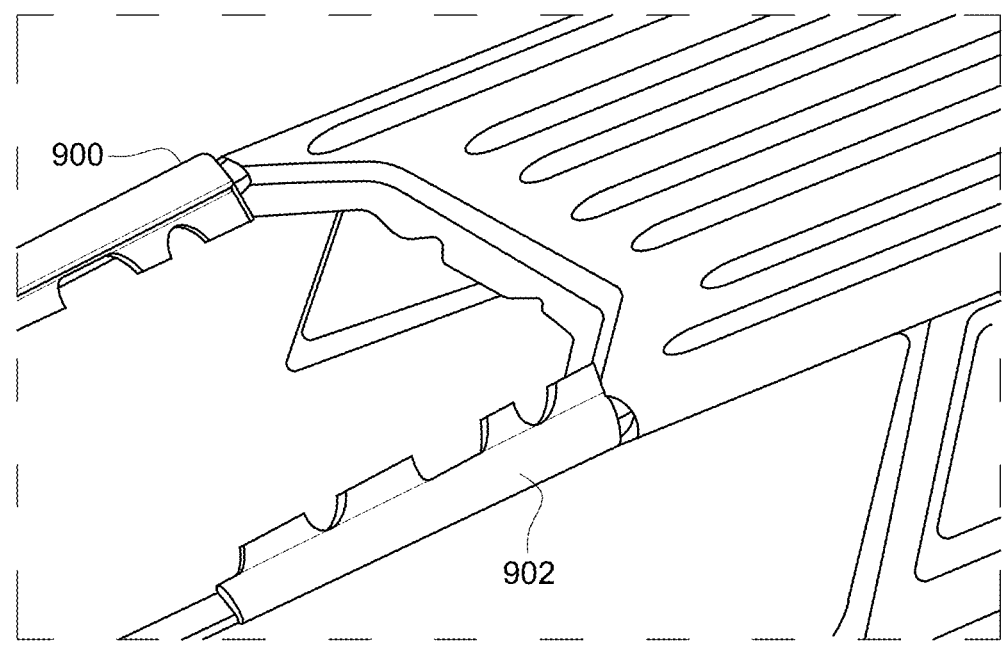

As shown in FIG. 4, the vehicle may come with a factory installed top having a rear portion (400) and a panel (402). FIGS. 5, 6 and 7 depict the inside of the factory installed top and shows that the latches are unlatched and the clamp at the windshield released to remove the panel (402). This leaves the top with right rail (800) and left rail (802) attached to the rear portion only (400). A right side foam spacer (900) is placed on the right rail (800) and a left side foam spacer (902) is placed on the left rail (802). FIG. 17 depicts a left side foam spacer (1800). As can be seen there are semi-circular openings (1802, 1804) and lip (1806). Next the vehicle top portion (1500) is placed with the back left L-latch (1506), back right L-latch (1508), front left L-latch (1510), front right L-latch (1512), left side windshield latch (1514) and right side windshield latch (1516) on the underside of the vehicle top portion (1500) and therefore not seen in FIG. 10 (as it on the underside).

Figure 13:
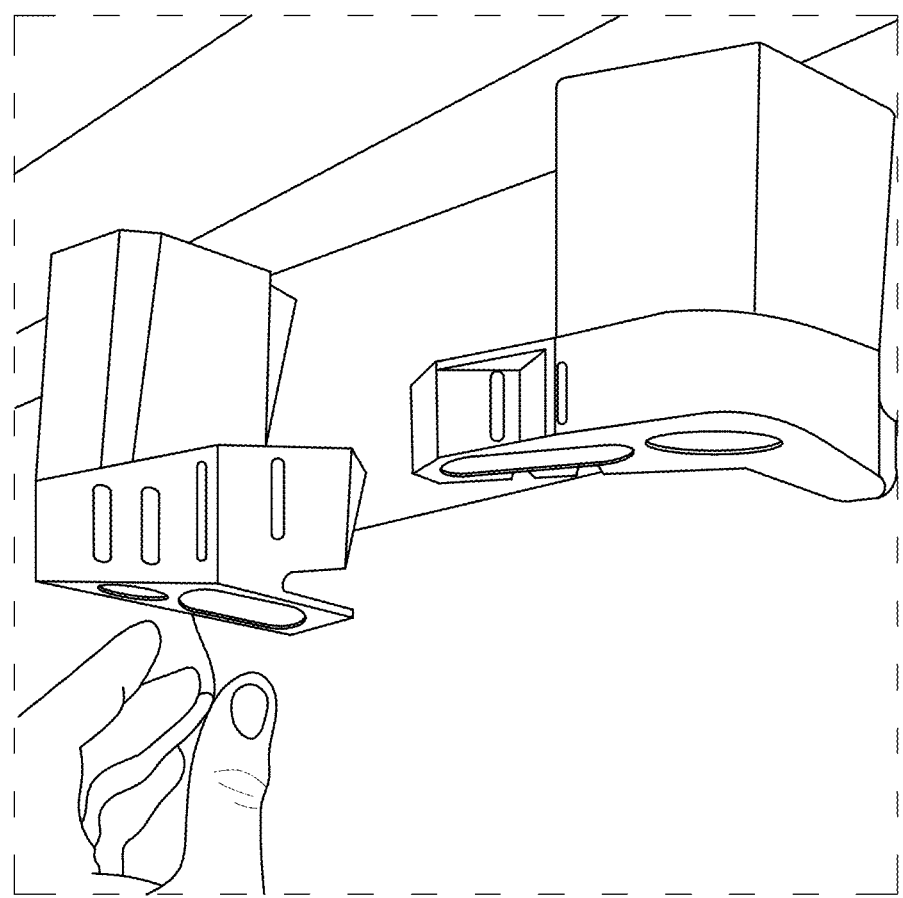
Figure 14:
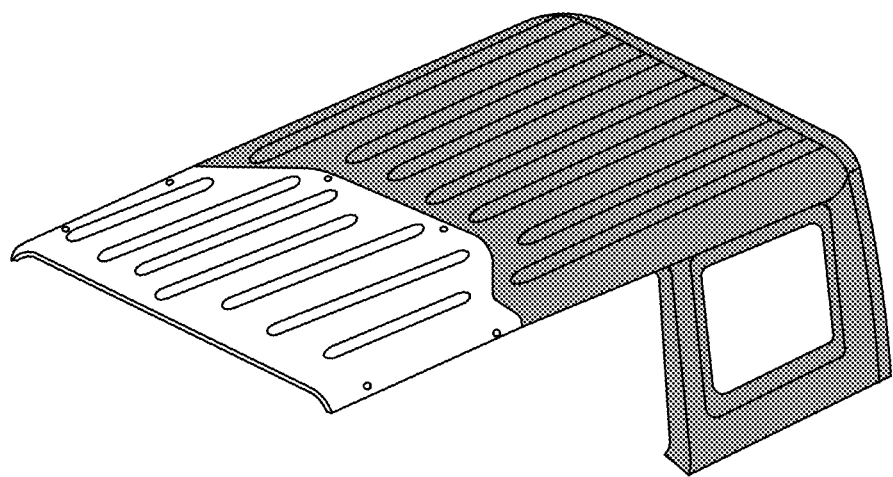

Next T-knobs are loosely tightened on the underside and the front left L-latch (1510), front right L-latch (1512), left side windshield latch (1514) and right side windshield latch (1516) are closed and secured. The next step, as shown in FIG. 13 is to Latch the back right L-latch and the back left L-latch.

The present invention represents many advancements in the art. The front left L-latch (1510), the front right L-latch (1512), the back right L-latch (1508) and the back left L-latch (1506) are depicted in detail in FIG. 19. As can be seen, there is a bottom base portion (2000), a top L portion (2002) and a bolt (2004) that runs through an opening in the top L portion (2002), an opening in the bottom base portion (2000) and through the vehicle top (2006). The top L portion (2002) turns to attach the vehicle top (2006) to the vehicle. The bottom base portion (2000) remains stationary.

FIG. 21 depicts an example of a windshield latch. It may be either the left side windshield latch (1514) and/or the right side windshield latch (1516). One of the novel aspects of the windshield latches is the raised spacer (2200). There are screws (2208), (2210) and (2212). There may be a built-in latch cushioning rubber (2204) and a latch handle (2202) (which is depicted in the vertical open position). The latches operate the same as OEM, with the spacer created to accommodate the missing fiberglass mass of the frame of the OEM panel to work with the thin material of the polycarbonate.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

We claim:

1. A vehicle top latch and seal assembly system, comprising:
   a waterproof, transparent hard top vehicle top portion having a back portion, front portion, left portion and right portion;
   a back left L-latch attached to the back portion;
   a back right L-latch attached to the back portion;
   a front left L-latch attached to the front portion;
   a front right L-latch attached to the front portion;
   a left side windshield latch;
   a right side windshield latch; and a left foam spacer in communication with the left portion of the vehicle top portion and a right foam spacer in communication with the right portion of the vehicle top portion.

2. A vehicle top latch and seal assembly system as in claim 1, wherein the at least one foam spacer is an elongated piece with at least one semi-circular opening and a lip.

3. A vehicle top latch and seal assembly system as in claim 1, further comprising at least one T-knob assembly on a left portion and at least one T-knob assembly on the right portion.

4. A vehicle top latch and seal assembly as in claim 3, wherein the T-knob assembly has a single thumb screw, a hex nut, a lock washer, a rubber washer, an o-ring and a screw.

5. A vehicle top latch and seal assembly system as in claim 1, wherein the back left L-latch, the back right L-latch, front left L-latch and front right L-latch have a bottom base portion, a rotating top L portion and a bolt that runs through an opening in the top L portion, an opening in the bottom base portion and through the vehicle top.

6. A vehicle top latch and seal assembly system as in claim 1, wherein the vehicle top portion has at least one raised portion.

7. A vehicle top latch and seal assembly system as in claim 1, wherein the left side windshield latch and the right side windshield latch each have a raised spacer, three screws running through, a latch cushioning rubber and a latch handle with an open position and a closed position.

8. A vehicle top latch and seal assembly as in claim 7, wherein the raised spacer is at an angle between one and fifteen degrees relative to the horizontal.

9. A vehicle top latch and seal assembly system as in claim 1, wherein the left portion has a flat section along the back portion and a slanted cutout section that runs from the flat section to a left side of the left portion of the vehicle top portion.

10. A vehicle top latch and seal assembly system as in claim 1, wherein the right portion has a flat section along the back portion and a slanted cutout section that runs from the flat section to a right side of the right portion of the vehicle top portion.

11. A vehicle top latch and seal assembly system as in claim 1, wherein a left side of the left portion and a right side of the right portion are rounded.

12. A vehicle top latch and seal assembly system as in claim 1, having a centerline between the left portion and the right portion.

13. A vehicle top latch and seal assembly system, comprising:
    a waterproof, transparent hard top vehicle top portion having a back portion, front portion, left portion with a rounded left side and right portion with a rounded right side;
    a back left L-latch attached to the back portion;
    a back right L-latch attached to the back portion;
    a front left L-latch attached to the front portion;
    a front right L-latch attached to the front portion;
    a left side windshield latch;
    a right side windshield latch;
    at least one T-knob assembly on a left portion and at least one T-knob assembly on the right portion; and
    a left foam spacer in communication with the left portion of the vehicle top portion and a right foam spacer in communication with the right portion of the vehicle top portion.

14. A vehicle top latch and seal assembly system as in claim 13, further comprising as least one foam spacer.

15. A vehicle top latch and seal assembly system as in claim 14, wherein the at least one foam spacer is an elongated piece with at least one semi-circular opening and a lip.

16. A vehicle top latch and seal assembly system as in claim 15, wherein the at least one foam spacer is a left foam spacer in communication with a left portion of the vehicle top portion and a right foam spacer in communication with a right portion of the vehicle top portion.

17. A vehicle top latch and seal assembly system as in claim 13, wherein the T-knob assembly has a single thumb screw, a hex nut, a lock washer, a rubber washer, an o-ring and a screw.

18. A vehicle top latch and seal assembly system as in claim 13, wherein the back left L-latch, the back right L-latch, front left L-latch and front right L-latch have a bottom base portion, a rotating top L portion and a bolt that runs through an opening in the top L portion, an opening in the bottom base portion and through the vehicle top.

19. A vehicle top latch and seal assembly system as in claim 13, wherein the left side windshield latch and the right side windshield latch each have a raised spacer, three screws running through and attaching the raised spacer to the vehicle top portion, a latch cushioning rubber and a latch handle with an open position and a closed position.

20. A vehicle top latch and seal assembly as in claim 19, wherein the raised spacer is at an angle of is at an angle between one and fifteen degrees relative to the horizontal.

21. A vehicle top latch and seal assembly system as in claim 13, wherein the left portion has a flat section along the back portion and a slanted cutout section that runs from the flat section to a left side of the left portion of the vehicle top portion.

22. A vehicle top latch and seal assembly system as in claim 13, wherein the right portion has a flat section along the back portion and a slanted cutout section that runs from the flat section to a right side of the right portion of the vehicle top portion.

* * * * *